Patented Aug. 26, 1952

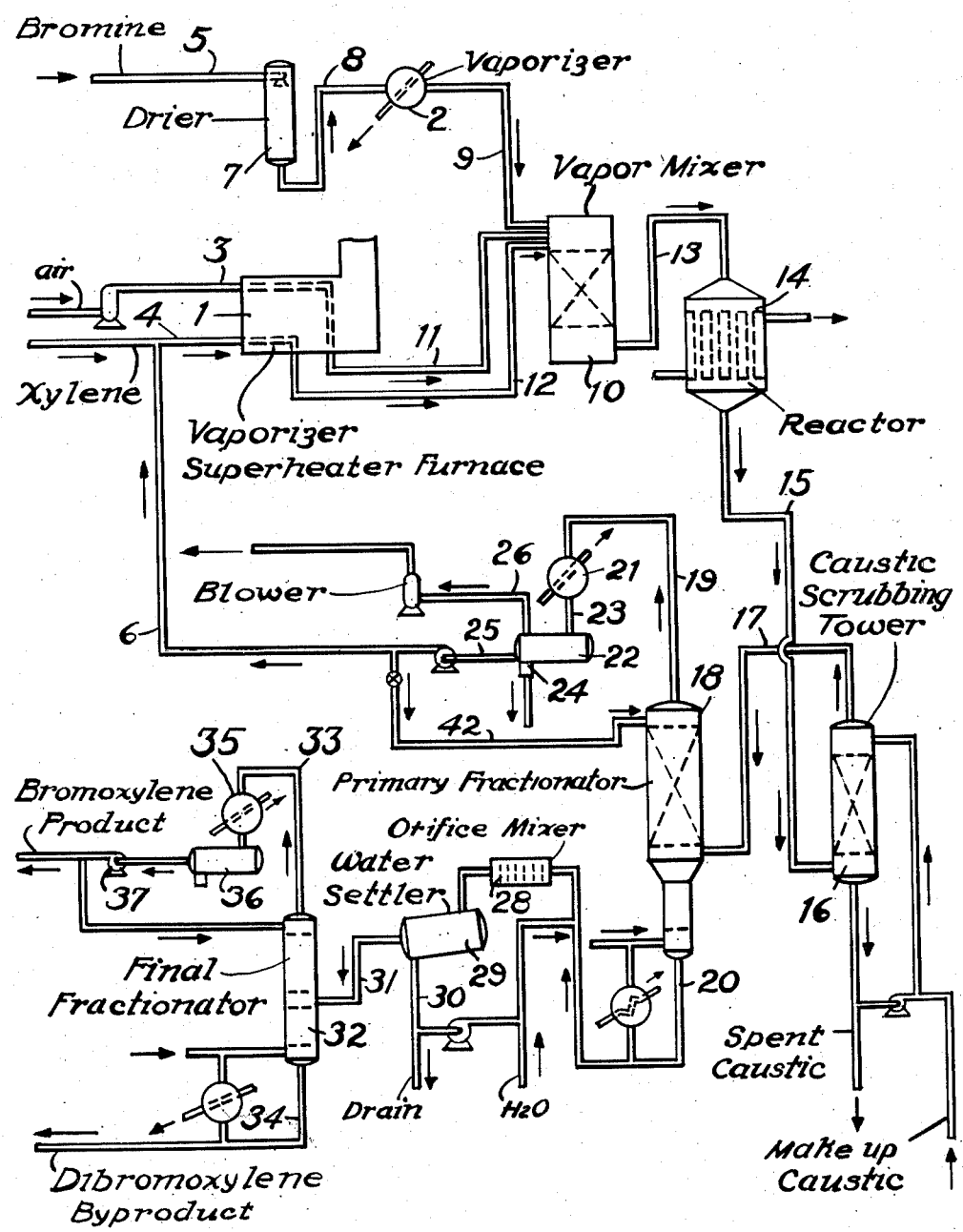

2,608,590

UNITED STATES PATENT OFFICE 2,608,590

PROCESS FOR MANUFACTURING BROMOXYLENES

Homer F. Johnson, Jr., Cranford, and Harold W. Scheeline, East Orange, N. J., assignors to Standard Oil Development Company, a corporation of Delaware Application December 2, 1948, Serial No. 63,186

1 Claim. (Cl. 260—650)

The present invention relates to an improved process for manufacturing bromoxylenes. In accordance with this invention, mixed isomeric xylenes are vaporized and superheated, mixed with air and bromine, and are then passed through a catalyst reaction zone wherein the reactants are substantially converted to monobromoxylenes. The invention is also of application to the bromination of a particular xylene as well as to a mixture of isomeric xylenes.

At the present time there is no commercial process for the production of bromoxylenes in operation. It is known that bromoxylenes may be produced by a two step bromination process in which bromine is first reacted with the xylenes forming bromoxylene and hydrogen bromide. The hydrogen bromide may then be subjected to some process wherein free bromine is liberated such as one analogous to the Deacon process. Free bromine may then be recycled to the bromination stage of the reaction. The disadvantage of such a process is that it requires essentially two reaction stages necessitating the utilization of two separate reaction zones. Furthermore, the step of breaking down the hydrogen bromide to free bromine is rather difficult, necessitating high temperatures and being accompanied by difficult corrosion problems. It is, therefore, the principal objective of this invention to overcome the stated disadvantages of the indicated conventional process for producing bromoxylenes. In particular it is the objective of this invention to provide a relatively simple one step process for converting bromine and xylenes to bromoxylenes without the evolution of hydrogen bromide.

The present invention is also intended to provide an economical process for obtaining improved lead scavenging agents. It has been discovered that the bromoxylenes are extremely desirable agents to employ in a leaded gasoline to reduce the deposition of lead compounds in the cylinders of an engine when the gasoline is burned. The bromoxylenes serve the function of providing bromine to react with the lead to form relatively volatile lead bromide which will substantially be exhausted from the combustion zone without leaving the objectionable deposits referred to. In adapting this discovery to commercial application, it is important to develop a more commercially attractive process for obtaining bromoxylenes than has heretofore been known. The process of this invention fulfills this need.

In gaining an understanding of the process of this invention it will be helpful to note that the process is analogous to the step of the Raschig process wherein benzene is chlorinated to give chlorobenzene. In this step of the Raschig process, mixed vapors of hydrogen chloride, benzene, and air are catalytically reacted to yield chlorobenzene. The present process is based on the appreciation that a similar bromination process may be conducted for obtaining bromoxylenes although in the process of this invention, bromine is utilized rather than hydrogen bromide and the percentages of the reactants and the reaction conditions are necessarily different than those employed in the Raschig process.

In the process of this invention, mixed xylenes, or a particular xylene, are vaporized and heated in a furnace and then mixed with bromine vapor and hot air. The vapors of xylene, air, and bromine are then passed through a reactor containing a suitable catalyst. Catalysts which may be used comprise a salt of copper together with one or more compounds of iron, cobalt, nickel, cerium, thorium, vanadium, magnesium, molybdenum, and the rare earths. In the presence of such catalysts, the xylene, bromine, and air react to yield bromoxylenes substantially without any evolution of hydrogen bromide. The reaction products, if desired, may be fractionated to secure monobromoxylenes of high purity.

By referring to the following description in connection with the accompanying drawing, the novel bromination process of this invention may be fully understood. Illustrated in the appended drawing is an example of the application of this invention to the bromination of a stream of mixed xylenes.

Referring to the drawing, the numeral 1 designates a superheater furnace. The furnace may be of any desired type providing coils or tubes in which the incoming reactants may be heated. The furnace, for example, may comprise an oil fired furnace in which coils are provided in the hot combustion gases for passage and heating of the reactants. Thus, if desired, the separate streams of air, xylene, and bromine may be heated in the furnace. However, it is preferred that the bromine be separately heated in the heater 2. By this means it is possible to heat the bromine under carefully controlled heating conditions. More particularly, therefore, a stream of air is introduced into the coils of furnace 1 through line 3 while a stream of xylene is introduced into the coils of furnace 1 through line 4. This makeup xylene, as will be seen, is mixed with xylene recycled through line 6 to provide a total amount of xylene entering furnace 1 of about 23,500 pounds per hour.

It is preferred that about 1017 pounds per hour of air be introduced while about 1740 pounds per hour of makeup xylene should be introduced through the indicated lines 3 and 4. Bromine is introduced to the system through line 5; preferably about 1185 pounds of bromine per hour are utilized. As indicated by these figures, it is preferred that the ratio of xylene to bromine be about 15 times the theoretical amount of xylene required to react with the bromine; more broadly, the ratio of xylene employed may constitute about 10 to 25 times the theoretical amount required to react with the bromine. Similarly, while the preferred ratio of air to bromine is about 2:1 times the theoretical amount of air required in the reaction; more broadly, from about 1.2 to 2.5 times the theoretical amount of air may be employed.

The bromine introduced into the system through line 5 is preferably dried in a suitable drying apparatus 7. The drying operation may be conducted by contacting the liquid bromine with concentrated sulfuric acid in drier 7 which may conveniently be carried out by flowing the bromine countercurrently to a flow of sulfuric acid. This operation is conducted at ambient temperatures and at atmospheric pressures, or, if desired, at elevated temperatures and pressures.

The dried bromine is withdrawn from drier 7 through line 8 for introduction to the vaporizer 2. The vaporizer 2 may be the conventional type of simple heat exchanger in which steam is utilized to vaporize the bromine to give a vapor temperature of about 200° F. or higher. The bromine is then removed from the vaporizer through line 9 for introduction to the vapor mixer 10 wherein the bromine is mixed with the heated vapors of air and xylene from the coils of furnace 1. Thus a stream of heated air is introduced to the vapor mixer 10 through line 11 while a stream of heated xylene is introduced to vapor mixer 10 through line 12.

While not critical, it is preferred that the air and xylene have a temperature of about 300° F. or greater. While any desired type of vapor mixer may be used, it is contemplated that the mixer may comprise a vertical brick-lined tower filled with tile packing. By passing the streams of bromine, air, and xylene through such a tower, the streams will be thoroughly mixed.

The mixed streams will be removed from vapor mixer 10 through line 13 at a temperature of about 300° F. or higher.

The stream of heated mixed vapors in line 13 is introduced to the bromination reactor 14. The bromination reactor may consist of a shell-tube type of reactor in which the tubes are packed with a suitable catalyst. As generally indicated, the catalyst may comprise a salt of copper together with one or more compounds of particular metals. More specifically, it is preferred that the catalyst consist of a porous inert material having a large surface area on which the active catalyst material is mounted or is impregnated. Thus it is preferred that an inert material such as alumina, silica gel, or pumice should be employed as a carrier material on which the active material of the catalyst is deposited.

While a variety of copper salts may be employed, it is preferred that the salt comprise copper bromide. With the copper bromide one or more compounds of the following metals are mixed: iron, cobalt, nickel, cerium, thorium, vanadium, magnesium, molybdenum, and the rare earths. Compounds of these metals, such as the oxides, may be employed. It is particularly preferred that the catalyst consists of about 6.7% of $CuBr_2$, 54.0% of $ThO_2$, and 39.3% of $CeO_2$ suspended on 8-10 mesh pumice.

The mixed vapors of bromine, air, and xylene are passed through the tubes of the reactor 14 containing the indicated catalyst material. The contact of the mixed vapors and the catalyst material is at a temperature of about 300° F. and at atmospheric pressures, although higher temperatures and pressures may be employed. It is essential that the temperature of the exit gases from the reactor be in excess of the dew point of the mixture, that is, the temperature should be above 300° F. The preferred upper limit of reaction temperature is about 600° F.

Employing the quantity of feed materials indicated, a suitable capacity reactor will be provided by utilizing 4 reactors having a diameter of about 43″ and a vertical height of about 12′, being equipped with about 52 tubes of 3″ diameter about 10′ in length.

The catalytic bromination of the xylenes proceeds readily and rapidly with the evolution of considerable heat. A sufficient contact time will be provided employing the indicated stream mass velocities and the indicated capacity of reactors. The contact time is relatively short, being of the magnitude of about 0.5 to 10 seconds and preferably about 2 seconds.

In order to cool the reactor sufficiently to absorb the exothermic heat of reaction evoluted, a stream of air or water may be circulated through the reactor externally of the catalyst tubes. Sufficient air or other cooling medium is employed so that the reaction products may be withdrawn at a temperature not substantially greater than the input temperature employed, that is, at a temperature somewhat above 300° F. The reaction which takes place in the reactor is principally a combination of 2 moles of xylene with 1 mole of bromine and a ½ mole of oxygen to yield 2 moles of monobromoxylene and 1 mole of water. The reaction products withdrawn from the reactor through line 15 will, therefore, comprise principally monobromoxylenes together with small amounts of water, carbon dioxide, and hydrogen bromide. A small percentage of dibrominated xylenes will also be obtained from the reactor. Mixed with these reaction products will be the unreacted xylene, oxygen, and nitrogen. A typical stream composition from a reactor employed at the indicated feed inputs is given in Table I below.

*Table I*

| Compound | Pounds per hour |
|---|---|
| Hydrogen Bromide | 12 |
| Xylene | 22,007 |
| Oxygen | 77 |
| Nitrogen | 780 |
| Monobromoxylene | 2,460 |
| Dibromxylene | 177 |
| Water | 143 |
| Carbon Dioxide | 46 |
| Total | 25,702 |

As this stream of compounds is extremely corrosive, it is a particular feature of this invention that the stream be passed through a caustic scrubbing tower wherein the hydrogen bromide is removed. The stream of line 15 is therefore conducted to tower 16 wherein the stream may be countercurrently contacted with aqueous caustic solution. A suitable tower may consist of a brick-lined tower having a diameter of about 3½ feet and a vertical height of about 12 feet, being filled with contacting rings or other packing material.

Caustic is preferably introduced at the top of this tower while the vapor products from reactor 14 are preferably introduced at the bottom of the tower. The caustic contacting will be effective in removing any hydrogen bromide which will be removed with spent caustic from the bottom of the contactor 16. The caustic scrubbed stream of reaction products will therefore be removed from the top of contactor 16 through line 17. This stream is now substantially noncorrosive so that the remaining process steps can be carried out in conventional steel equipment.

Line 17 carries the reaction products into a primary fractionator 18 which may comprise any desired type of fractionating equipment. Fractionator 18 is operated so as to permit removal as a bottoms product of the brominated xylene while the remaining gases are removed overhead. Thus a stream of gases is removed from fractionator 18 through line 19 which comprises nitrogen, oxygen, water, carbon dioxide, and xylene. Similarly, the stream removed from the bottom of the fractionator through line 20 consists of mono and di-brominated xylene. The overhead stream is passed through condenser 21 which is operated so as to condense the xylene which may be accomplished by dropping the temperature of the stream of gases to about 120° F.

The stream of condensed and gaseous products is introduced into separator 22 through line 23. The separator may, if desired, consist of a tank providing an overhead withdrawal, a side stream withdrawal, and a bottom's withdrawal. By this means it is possible to withdraw the condensed water from the bottom of the settler through line 24 and the condensed xylene from the side stream withdrawal of the separator through line 25 while the uncondensed gases are removed through line 26 of the separator. The gases withdrawn through line 26 may be disposed of as desired. These gases will contain a small percentage of xylene and may have a typical composition as indicated in Table II.

*Table II*

| Compounds | Pounds per hour |
| --- | --- |
| Nitrogen | 780 |
| Oxygen | 77 |
| Water | 46 |
| Carbon Dioxide | 46 |
| Xylene | 110 |
| Total | 1,059 |

The side stream withdrawal, consisting essentially of unreacted xylene, may be recycled to the furnace vaporizer 1 through line 6, although a portion of the stream may be returned to fractionator 18 through line 42 as reflux. This stream will have a typical composition as indicated in Table III.

*Table III*

| Compounds | Pounds per hour |
| --- | --- |
| Xylene | 21,760 |
| Monobromxylene | 30 |
| Total | 21,790 |

As formerly indicated, the stream of xylene in line 6 is combined with the makeup xylene introduced through line 4 to provide the total xylene input to the process.

Returning now to the stream withdrawn through line 20 of fractionator 18, this stream is passed to an orifice mixer 28 wherein it is mixed with water. The water functions to remove any entrained material contained in the stream which, as stated, consists principally of brominated xylene. The water is settled from the bromoxylene in water settler 29 after admixture with the water in mixer 28. Water is removed from settler 29 at the bottom thereof through line 30 for disposal or recirculation, as desired.

The water washed stream of brominated xylene may be withdrawn from the water settler through line 31 as the final product of the bromination process. The product contained in line 31 will consist principally of monobrominated xylene, containing small proportions of dibrominated xylene.

If desired, the product of line 31 may be carried to a further fractionation tower for separation of the monobrominated product from the dibrominated product. For example, if as suggested, the brominated xylene is to be employed as a lead scavenging agent in a leaded motor fuel, it is generally desirable to fractionate the product of line 31 so as to segregate the monobrominated xylene. The stream of line 31 is therefore introduced to the final fractionator 32 which may consist of any desired type of conventional fractionating equipment. The fractionator is operated so as to drive the monobromxylene product overhead to be removed through line 33 and so as to permit removal as a bottom's product of the dibromoxylene which is removed through line 34. The overhead stream of line 33 is preferably passed to a condenser 35 and to a settler 36. A small amount of water will be condensed with the bromoxylene in the condenser 35 which may be removed from the settler 36.

The final bromoxylene product consists essentially of monobromoxylenes with a trace of dibromoxylenes and a small amount of unreacted xylene. A typical composition of the final product removed through line 37 is indicated in Table IV.

*Table IV*

| Compounds | Pounds per hour |
| --- | --- |
| Xylene | 137 |
| Monobromxylene | 2,400 |
| Dibromxylene | 10 |
| Total | 2,547 |

A typical composition for the stream removed through line 34 from the bottom of fractionator 32 is also indicated in Table V.

*Table V*

| Compounds | Pounds per hour |
| --- | --- |
| Monobromoxylene | 30 |
| Dibromoxylene | 167 |
| Total | 197 |

It is to be understood that the foregoing description of this invention relates to an example of the invention and does not limit the scope of the invention. For example, while it has been stated that the xylene may be brominated by employing bromine, it is contemplated that hydrogen bromide may alternatively be employed. The novelty of the process described is defined by the appended claim.

We claim:

A process for brominating xylene in which a gaseous stream of bromine, air, and xylene is contacted with a catalyst comprising $CuBr_2$, $ThO_2$ and $CeO_2$ at a temperature of about 300 to 600° F., wherein the ratio of xylene to bromine is about 10 to 25 times the theoretical requirement and the ratio of air to bromine is about 1.8 to 2.5 times the theoretical requirement based on the reaction of two moles of xylene with one mol of bromine and one-half mol of oxygen, and in which the bromination product is washed with caustic and is fractionated to segregate a monobromo xylene fraction and an unreacted xylene fraction, the xylene fraction being recycled to the bromination step of the process.

HOMER F. JOHNSON, JR.
HAROLD W. SCHEELINE.

REFERENCES CITED

The following references are of record in the file of this patent:

UNITED STATES PATENTS

| Number | Name | Date |
|---|---|---|
| 1,591,984 | Krause et al. | July 13, 1926 |
| 1,963,761 | Prahl | June 19, 1934 |
| 2,257,903 | Dreisbach | Oct. 7, 1941 |

FOREIGN PATENTS

| Number | Country | Date |
|---|---|---|
| 108,424 | Austria | Dec. 27, 1927 |

OTHER REFERENCES

Beilstein, "Handbuch der organischen Chemie," vol. 5, main volume, pp. 365–7, 374–5, 385–6 (1922).